ELECTROMAGNETIC WAVE EQUALIZATION

Filed April 14, 1954 2 Sheets-Sheet 1

INVENTOR
W. W. MUMFORD
BY Roy M. Porter Jr.
ATTORNEY

INVENTOR
W. W. MUMFORD
BY Roy M. Porter, Jr.
ATTORNEY

United States Patent Office 2,767,379
Patented Oct. 16, 1956

2,767,379

ELECTROMAGNETIC WAVE EQUALIZATION

William W. Mumford, Parsippany-Troy Hills Township, Morris County, N. J., assignor to Bell Telephone Laboratories, Incorporated, New York, N. Y., a corporation of New York Application April 14, 1954, Serial No. 423,199
6 Claims. (Cl. 333—28)

This invention relates to electrical equipment employing high frequency electromagnetic waves, and more specifically to microwave systems and components involving a non-linear phase versus frequency reflection of the electromagnetic waves.

In electrical systems involving a broad band of frequencies it is often desirable to delay signals of one frequency to a greater extent than signals of other frequencies. In extended transmission systems employing wave guides, for example, electromagnetic waves of higher frequencies travel faster than lower frequencies. This gives rise to what is termed phase delay distortion, which may be corrected, or equalized, by delaying the higher frequency components to a greater extent than the lower frequencies. Frequency dispersive delay units are also useful in pulse communication systems where it is desired to increase the signal-to-noise ratio, or the instantaneous amplitude, of variable frequency pulses. In these systems, it is particularly desirable to have the dispersive delay unit adjusted to match the delay distortion of the line which is being equalized, or to complement the frequency versus time characteristic of the pulses which are transmitted.

For use at lower frequencies, it has previously been proposed to construct adjustable networks having suitable delay versus frequency dispersion characteristics, through the use of lumped inductances and capacitances. In the microwave frequency region, however, these lumped constant circuits are impractical and it is not believed that any effective equivalent of these networks at high frequencies has been developed up to the present time. A reflection technique has, however, been developed by which the distorted signal, or the pulse signal to be improved, is applied to a microwave component having a non-linear phase versus frequency reflection characteristic that complements the dispersion characteristic of the associated high frequency equipment. One type of reflector takes the form of a tapered wave guide section that has a tapered cut-off characteristic. The input signal is applied to the taper and the output comprises the reflection from the taper. For devices of this type to operate effectively a form of balance must be presented at the input circuit, balance in this sense meaning that no component of the reflected signal is able to return to the input circuit. In the prior art arrangements this meant that two identical tapers must be used in a balanced arrangement which imposed severe restrictions upon the identical nature of the two tapers and upon the critical phase differences which must be maintained over a broad band of frequencies.

It is therefore an object of the present invention to simplify and improve apparatus for equalizing phase delay distortion of a high frequency electromagnetic wave signal.

It is a further object of the invention to improve the effective balance presented at the input circuit of an equalizer over a broad band of high frequencies.

The invention as viewed from one aspect involves the correction of an electromagnetic wave having dispersed frequency components through the use of a reflecting taper unit and a specialized coupler for applying the electromagnetic wave to the reflecting unit. In accordance with one somewhat broader aspect of the invention, it has been discovered that electromagnetic waves may be reflected through the use of plane of polarization selective wave guide elements and a 45 degree Faraday effect unit coupled to the reflecting microwave component.

In the systems of the types described it often happens that the phase delay distortion is accompanied by a certain amount of non-linear amplitude versus frequency distortion. A principal feature of the present invention involves the additional equalization of this amplitude distortion by a reflecting taper having particularly located resistive means within it.

Additional objects and features and advantages of the invention will be developed in the course of the detailed description of the drawings. In the drawings.

Figure 1:
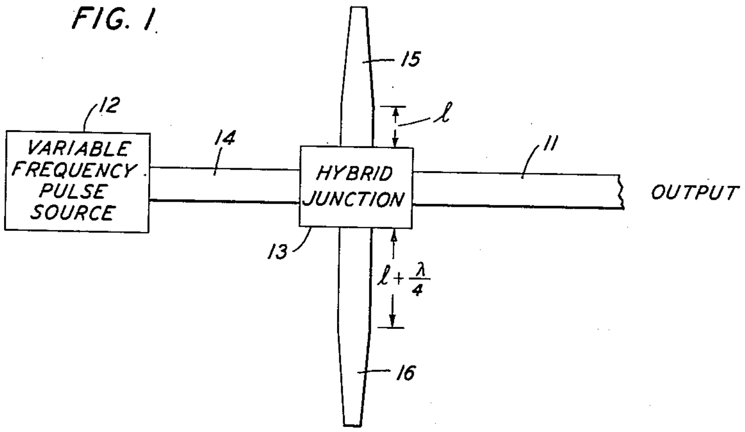
Fig. 1 illustrates the prior art use of tapered wave guide sections to increase the instantaneous signal-to-noise ratio of a variable frequency pulse.

Fig. 1 shows, by way of example and for purposes of illustration, a pulse system in which the pulse at the output wave guide 11 is made substantially shorter and sharper than that at the output of the pulse source 12. This effect is particularly useful in pulse-signaling systems where the pulse sharpness may determine the information capacity of the equipment. Systems which operate in this manner are discussed in detail in S. Darlington's application Serial No. 136,289 filed December 31, 1949, and will be reviewed but briefly here.

In Fig. 1, the pulse source 12 produces pulses which are of moderately long duration and vary from a high frequency at the start of the pulse to a substantially lower frequency at the end of the pulse. These pulses from pulse generator 12 are coupled to hybrid junction 13 by means of wave guide 14. The energy applied to the hybrid junction divides with one half of the energy entering each of the tapered sections 15 and 16 connected to opposite arms of hybrid 13. Taper 16 is located one-quarter wave-length further from hybrid 13 than taper 15. Taper sections 15 and 16 taper down from a large dimension which is greater than cut-off for the lowest frequencies in the original pulse to the constricted end which is less than cut-off for the highest frequencies in the original pulse. With each frequency component of the original pulse being reflected from both tapers at the cut-off point for that particular frequency, it is clear that the high frequency components will penetrate deeper into the taper sections than the lower components.

Because of this greater depth of penetration, the reflected higher frequency components have a longer round trip transmission path and a correspondingly increased elapsed time before returning to the hybrid junction than the lower frequency components of the original pulse. With the difference in elapsed time for the highest and lowest frequency components being made equal to the pulse length, the high and low frequency components, reflected from the taper 15, will arrive at the hybrid junction at substantially the same instant. This has the effect of shortening the pulse and greatly increasing its instantaneous amplitude as compared with the noise present in the circuit. If the wave energy at each component frequency reflected from taper 16 has traveled a total half wavelength further than the energy reflected from taper 15, the two components will combine in output guide 11 rather than in input guide 14. It is obvious that the tapers must be very carefully proportioned relative to each other in order not only to equalize the distortion across the band but to also maintain the required 180 degree phase difference between the reflected components at each frequency in the band. It is almost impossible to adjust the degree of taper in an operating setup without destroying this balance. It is of course possible to use only a single taper and therefore eliminate the requirement of balance, but such an arrangement involves the loss of a substantial part of the wave power which must be replaced by amplification.

Figure 2:
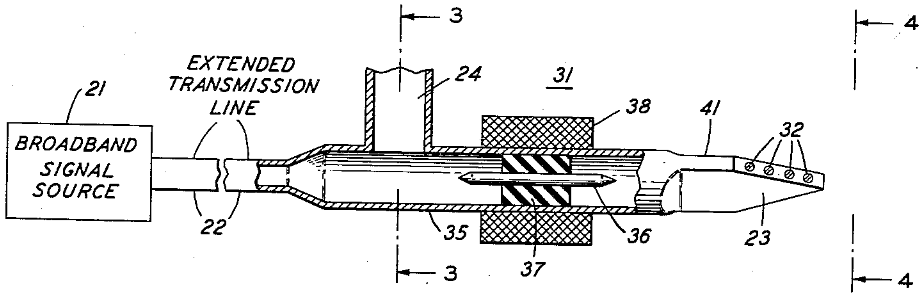
Figs. 2 through 4 represent a preferred form of the invention in which a reflecting taper section is used to compensate for the delay distortion of an extended transmission line.

In Fig. 2 is shown an equalizer in accordance with the present invention employing only a single taper 23 which is similar to either taper 15 or 16 of Fig. 1. For illustration, the equalizer of Fig. 2 is shown as it might be used to correct delay distortion of a broad band signal from a source 21 which distortion is introduced by an extended transmission line 22. In line 22 the higher frequencies of the broad band signal travel at a greater velocity than the lower frequencies. This gives rise, if uncorrected, to perceptible and in some cases serious distortion of the signals. One of the basic facts underlying the present invention is that the dispersive delay introduced by the single tapered reflecting wave guide 23 is of the proper sign and easily adjustable in amplitude to compensate for the phase delay distortion of extended transmission line 22.

Returning to a consideration of the means for coupling wave guide 22 to the taper 23, and the reflected wave therefrom to the output wave guide 24, the nature of the 45 degree Faraday effect unit 31 must be discussed in some detail. It is known that when a polarized electromagnetic wave is applied to an insulating ferromagnetic material which is magnetically polarized in the direction of propagation of the electromagnetic wave, the plane of polarization of the electromagnetic wave will be rotated in a non-reciprocal manner. This type of wave guide unit is termed a microwave Faraday effect unit, and the effect is discussed in detail in an article by C. L. Hogan entitled "The Microwave Gyrator" which appeared at pages 1–31 of the January 1952 issue of the Bell System Technical Journal. A recent Patent No. 2,644,930 granted July 7, 1953, to C. H. Luhrs et al., discloses also a Faraday effect device.

The Faraday effect unit 31 of Fig. 2 is made up of a circular section of conducting wave guide 35, a central pencil of non-conducting ferromagnetic material 36, a dielectric support 37 for the pencil 36, and a magnet 38, for applying a longitudinal field to the ferromagnetic pencil 36. The ferromagnetic pencil 36 may be constructed of a polycrystalline ferrite such as (NiZn) $Fe_2O_3$ which is powdered and embedded in a dielectric matrix. Other non-conducting ferromagnetic materials which exhibit similar properties are known and have been discussed in the literature pertaining to this subject matter. The dielectric supporting member 37 is preferably of low dielectric constant, and may be constructed from an aerated dielectric material such as polyfoam.

Figure 3:
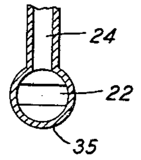

The length of the ferromagnetic pencil 31 and the intensity of the magnetic field are adjusted so that electromagnetic waves from the extended transmission line 22 will have their plane of polarization rotated 45 degrees counterclockwise from their original vertical polarization, in passing through the Faraday effect unit 31. This rotation will orient the electric vector parallel to the narrow side walls of the rectangular wave guide 41 so that the wave is accepted (and not reflected) by the wave guide 41. After passing through the plane of polarization selective means 41, the electromagnetic wave is reflected from the tapered wave guide 23 in the proper plane to be again accepted by the rectangular wave guide 41. In passing from right to left through the Faraday effect unit 31, the electromagnetic wave is rotated another 45 degrees in the same absolute sense (counterclockwise as viewed from left to right) and the electric vector of the electromagnetic wave in the circular wave guide 35 is now horizontal, or parallel with the broader side wall of the rectanguar wave guide 22, as may be clearly observed in Fig. 3. An electromagnetic wave of this orientation cannot, of course, be coupled into the wave guide 22 and will be coupled to the output branch wave guide 24 as shown in Figs. 2 and 3. The structure and mode of operation of the coupling between the circular wave guide 35 and the mutually orthogonal wave guides 22 and 24 is shown and described in much greater detail in the copending application of S. E. Miller, Serial No. 263,600 filed December 27, 1951.

In the operation of the equalizer of Fig. 2, the entire power of the electromagnetic wave is reflected into the single tapered wave guide section 23 and is reflected back according to its frequency components as was the energy in both tapers 15 and 16 of Fig. 1. No balance is required and a given non-linear phase versus frequency characteristic may be chosen and readjusted at will. If desired, adjusting means, such as tuning screws 32, may be provided along the tapered narrow walls in order to adjust the delay introduced to different frequencies across the band and thus to vary the delay dispersion of the taper section in order to more nearly complement the particular dispersion characteristic of associated electrical components. This is accomplished by varying the cut-off frequency of the taper section at successive points along its length in any desired manner. The cut-off frequency at various points may also be varied by deformation of the conducting wave guiding passageway or by shifting a dielectric core member to regions within the wave guide having different electromagnetic field intensities. In this latter type of arrangement, shifting the dielectric core member to a region of different field intensity has the effect of changing the average dielectric constant across the wave guide cross section, and thus changes the cut-off frequency.

Figure 5:
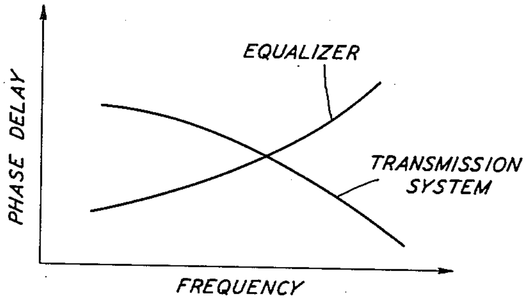
Fig. 5 illustrates the non-linear phase delay versus frequency characteristic of a transmission system to be equalized together with the complementary characteristic of the equalizer.

In Fig. 5 are shown for comparison the phase delay versus frequency characteristic of a long distance transmission system, such as line 22 of Fig. 2, and the characteristic of the reflecting equalizer, such as taper 32 of Fig. 2. Thus the delay produced by the transmission system is shown to decrease in a non-linear manner as the frequency of the wave energy increases. The delay versus frequency characteristic of the equalizer on the other hand is complementary to the delay of the system, in that its delay increases non-linearly with frequency so that the sum of the two delay characteristics is equal to a substantially constant value over the transmission band.

The above described adjustment and variation of the reflection characteristic is only possible because of the elimination of the balance required by the circuit of Fig. 1. This advantage directly stems from the non-reciprocal coupling unit comprising the Faraday effect unit 31 and the connections it provides between the taper and the input and output wave guides as it replaces the hybrid junction of Fig. 1. This type of non-reciprocal coupling arrangement is known as a circulator. Other types of circulators are discussed in the above-noted article of C. L. Hogan and in S. E. Miller's application Serial No. 371,437 filed July 31, 1953. As defined in said Miller application, the term "circulator" appropriately defines the coupling characteristic of a group of multi-branch networks having electrical properties such that electromagnetic energy appearing in one branch thereof, i. e., branch 41 of Fig. 2, is coupled to only one other branch, i. e., branch 22, for a given direction of transmission, i. e., for transmission through the structure of Fig. 2 from left to right but to another branch, i. e., branch 24, for the opposite direction of transmission. The term "circulator" is used to describe these networks and alternative physical forms of them are disclosed in the publications of C. L. Hogan, Bell System Technical Journal, January 1951, pages 1 through 31; Sakiotis and Chait, Proceedings of the Institute of Radio Engineers, January 1953, pages 87 through 93; C. L. Hogan, Reviews of Modern Physics, January 1953, pages 253 through 263; and J. H. Rowen, Bell System Technical Journal, November 1953, pages 1333 through 1369. Any of these circulators may be used in place of the hybrid 13 of Fig. 1 and in place of the Faraday effect unit 31 and its associated terminals as shown in Fig. 2.

Figure 4:
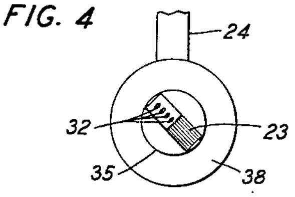
Figures 6, 7:
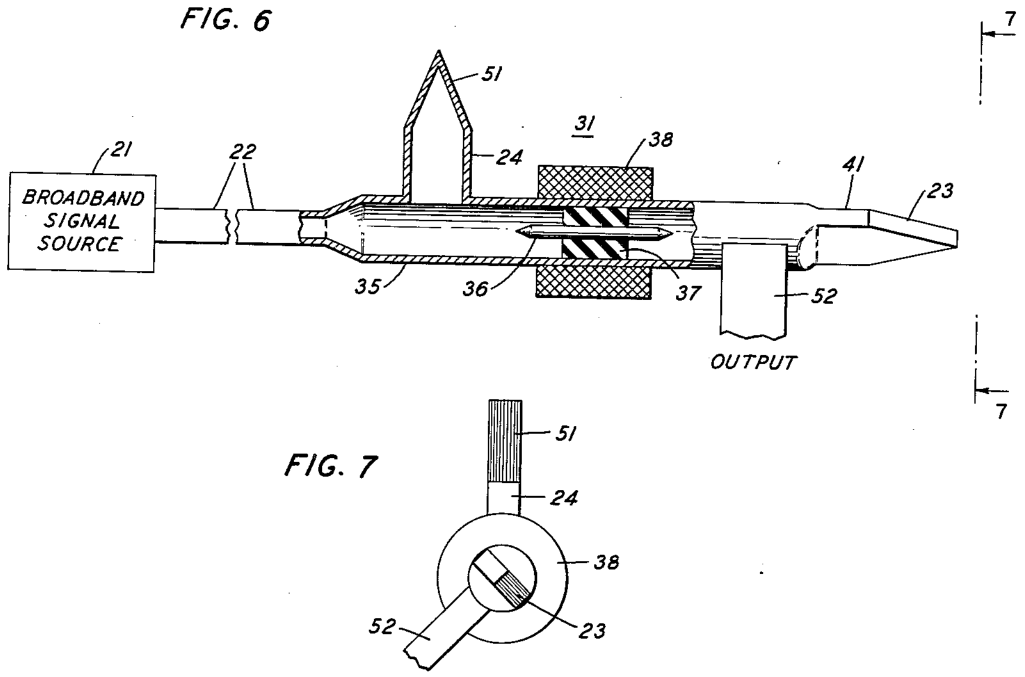
Figs. 6 and 7 illustrate a modification of the invention in which a pair of reflecting taper sections are employed to compensate for a substantial delay distortion.

Should the delay distortion of a given system be substantial, an unduly long taper section may normally be required for equalization. In the embodiment of the invention shown in Figs. 5 and 6 a substantial saving of space may be realized by employing two tapered sections. Referring to Figs. 5 and 6 it will be seen that in basic respects the structure is similar to that shown in Figs. 2, 3 and 4 and so corresponding reference numerals have been employed to designate corresponding components. Modification will be seen to reside in the fact that guide 24 is terminated in a second tapered section 51. The output is taken from a wave guide branch 52 comprising a polarization selective terminal which has been added to guide 35 adjacent guide 41. Guide 52 is oriented to accept wave energy polarized perpendicular to that accepted by guide 41.

Thus wave energy from guide 22 is rotated into the polarization of guide 41, is reflected by taper 23, further rotated by Faraday unit 31 into the polarization accepted by guide 24. The energy is then reflected by taper 51, and receives a further equalization thereby, to appear again in guide 35. Since its polarization is now perpendicular to that accepted by guide 22, it is reflected toward unit 31 to be rotated into the polarization accepted by guide 52 and thus to the output. Taper sections 23 and 51 may be identical in which case the total equalization factor will be twice that of one section. However, it is possible to simulate a desired phase versus reflection characteristic by making the tapers different so that their independent delay versus frequency characteristics add up to the desired characteristic. It should be noted that several units either of the type shown in Fig. 2 or of the type shown in Fig. 6 may be cascaded, that is, the output of one may be connected to the input of the following unit. If this is done, the total compensating delay versus frequency characteristic is the sum of the several independent delay versus frequency characteristics.

Figure 8:
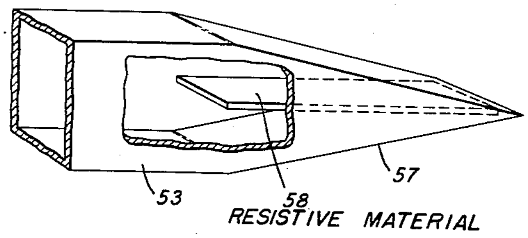
Figs. 8 and 9 illustrate detailed means of reflecting taper sections including vanes of resistive material for equalizing amplitude versus frequency distortion.

It is not uncommon in systems of the types described, for example, in a long distance wave guide system with interposed repeaters, for the phase delay distortion to be accompanied by a certain amount of nonlinear amplitude versus frequency distortion. In Fig. 8 is shown a detail of a taper section 57 that may be used in the combination of Figs. 2 or 6 in place of tapers 23 or 51 which will equalize the amplitude distortion along with the phase distortion. Included within taper 57 is a longitudinal septum of resistive material 58 extending parallel to the narrow wall of rectangular guide section 53. Such a septum will introduce to the wave reflected from taper 57 an amplitude characteristic that decreases as the frequency increases since the high frequency components which penetrate further into the taper are attenuated to a greater extent than the low frequency components. A low resistance septum will introduce more attenuation than a high resistance septum. If septum 58 is terminated short of the pointed end of taper 57, the attenuation at the higher frequencies is lessened.

Figure 9:
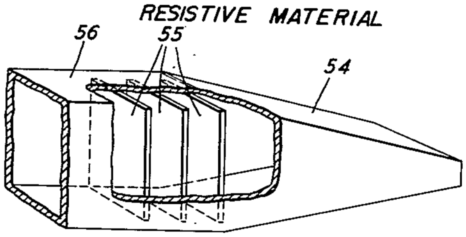

In Fig. 9 a plurality of thin resistive partitions extending perpendicular to the longitudinal axis of guide 56 are located in guide 56 at points just preceding the start of taper 54. Partitions 55 introduce shunt conductances to the energy, which when combined with the characteristic impedance of the guide will attentuate the low frequency components to a greater extent than the high frequency components. Thus partitions 55 will introduce an amplitude characteristic to the reflected wave that increases as the frequency increases. The magnitude of the attenuation is controlled by the resistance of the partition material, the number of partitions, and their thicknesses. It should be apparent that resistive septums, partitions, or other elements having non-linear attenuation versus frequency characteristics, may be employed in sections of straight or untapered guide to produce an amplitude equalization even though there is no need for phase distortion equalization.

When the term "tapered wave guide" or "tapered wave guide section" is employed in the present specification and claims, it signifies that the component in question has tapered cut-off characteristics, and not necessarily that the conducting portion of the wave guide is physically constricted in size. Inasmuch as the cut-off frequency of a wave guide is inversely proportional to the square root of the permeability and the dielectric constant as well as being inversely proportional to the wave guide dimensions, the tapered wave guides may be constructed of a section of wave guide having a uniform cross section but including a dielectric core member which tapers along the length of the wave guide section, for example. The dielectric constant could also be varied by tapering the amount of metal dust or compounds (such as lead chlorite and barium titanate) dispersed in a matrix such as polystyrene. Inasmuch as the presence of dielectric material tends to increase the effective cross section of the wave guide, the portions of the high dielectric constant sections of the wave guide should face the applied electromagnetic waves.

It is noted that the applications of J. R. Pierce, Serial No. 401,448, filed December 31, 1953, and W. J. Albersheim, Serial No. 401,544, filed December 31, 1953, deal with the subject matter which is closely related to that disclosed in the present application.

It is understood that the above-described arrangements are illustrative of the application of the principles of the invention. Numerous other arrangements may be devised by those skilled in the art without departing from the spirit and scope of the invention.

What is claimed is:

1. In combination with a microwave transmission system having a phase delay characteristic that decreases as the frequency of wave energy transmitted thereby increases, a multibranch network comprising first and second connected sections of wave guide, a pair of polarization-selective wave guide connections for said first section each adapted to couple to and from one of a pair of orthogonal polarizations of electromagnetic wave energy therein, said system being connected to one of said connections, a polarization-selective wave guide connection for said second section adapted to couple to and from a polarization of wave energy in said second section related by an angle to a polarization in said first section, said last named connection having a cut-off characteristic that progressively reflects wave energy components of increased frequency as the wave propagates away from said section, and an antireciprocal rotator of linearly polarized wave energy for producing an antireciprocal rotation of wave energy from one of said planes of polarization in one of said sections into one of said planes of polarization in the other of said sections, said rotator being interposed between said sections.

2. Apparatus for equalizing phase velocity dispersion in an electromagnetic wave transmission system, said apparatus comprising connected sections of wave guide each adapted to support said wave energy in a plurality of polarizations, a pair of polarization-selective connections at one section of said guide each coupled to one of a pair of orthogonal polarizations of wave energy therein, a polarization-selective connection at another section of said guide coupled to a polarization of wave energy therein related by an angle to one of said polarizations in said one section, means for applying a signal having distorted phase relationships to one of said connections, means having a non-linear phase versus reflection characteristic that equalizes said distorted phase relationships connected to another of said connections, output means connected to the remaining connection, and an antireciprocal rotator for producing a Faraday-effect rotation of the polarization of said energy equal to said angle interposed in a section of said guide between said one and said other sections.

3. In combination, a microwave circulator having at least three branches being connected within said circulator with one branch thereof connected to a second branch thereof for electrical transmission between said branches in a given direction only, said second branch being connected to a third branch only for a direction of transmission in said second branch opposite to said given direction, a microwave apparatus having a predetermined delay versus frequency characteristic being connected to said one branch, a tapered wave guide section having a delay versus frequency characteristic complementary with said predetermined characteristic coupled to said second branch, and output means connected to said third branch.

4. The combination according to claim 3 including a vane of resistive material included within said tapered wave guide section.

5. An electromagnetic wave equalization system comprising a circulator circuit having at least three branches being connected within said circulator with one branch thereof connected to a second branch thereof for electrical transmission between said branches in a given direction only, said second branch being connected to a third branch only for a direction of transmission in said second branch opposite to said given direction, input means for a signal of said wave energy having distorted phase relationships connected to said one branch, means having a non-linear phase versus reflection characteristic connected to said second branch, and output means for said wave energy connected to said third branch.

6. In combination, a circulator circuit having at least four branches being connected within said circulator with a first branch thereof connected to a second branch thereof for electrical transmission between said branches in a first direction only, with said second branch connected to a third branch only for a second direction of transmission in said second branch opposite to said first direction, and with said third branch connected to a fourth branch only for a direction of transmission in said third branch opposite to said second direction, a microwave transmission system having a delay versus frequency characteristic connected to said first branch, a pair of reflecting wave guide terminations each having a delay versus frequency characteristic connected respectively to said second and third branches, the sum of the delay versus frequency characteristic of said two terminations being complementary with the delay versus frequency characteristic of said system, and output means for said wave energy connected to said fourth branch.

References Cited in the file of this patent

UNITED STATES PATENTS

| | | |
|---|---|---|
| 2,514,779 | Martin | July 11, 1950 |
| 2,644,930 | Luhrs et al. | July 7, 1953 |